United States Patent [19]
Azuma

[11] Patent Number: 5,960,330
[45] Date of Patent: Sep. 28, 1999

[54] DIVERSITY GAIN CONTROLLED CELL-SITE TRANSMISSION TO PREVENT TRAFFIC SIGNALS FROM PROPAGATING BEYOND REACHABLE EXTENT OF CONTROL SIGNALS

[75] Inventor: Tomohiro Azuma, Tokyo, Japan

[73] Assignee: NEC Corporation, Japan

[21] Appl. No.: 08/914,061

[22] Filed: Jul. 15, 1997

[30] Foreign Application Priority Data

Jul. 17, 1996 [JP] Japan ..................................... 8-205521

[51] Int. Cl.⁶ .................. H04B 1/00; H04B 7/00
[52] U.S. Cl. ................ 455/70; 455/101; 455/522
[58] Field of Search .............. 455/69, 70, 522, 455/506, 101, 132, 133, 134, 135, 136, 269, 272, 273, 63, 65, 552, 561, 562, 68

[56] References Cited

U.S. PATENT DOCUMENTS

| | | | |
|---|---|---|---|
| 5,303,240 | 4/1994 | Borras et al. | 455/277.1 |
| 5,485,486 | 1/1996 | Gilhousen et al. | 455/69 |
| 5,487,185 | 1/1996 | Halonen | 455/67.1 |
| 5,535,215 | 7/1996 | Hieatt, III | 455/70 |
| 5,794,157 | 8/1998 | Haartsen | 455/63 |
| 5,799,245 | 8/1998 | Ohashi | 455/70 |

FOREIGN PATENT DOCUMENTS

| | | |
|---|---|---|
| 1173927 | of 1989 | Japan . |
| 5-29993 | of 1993 | Japan . |
| 5-30001 | of 1993 | Japan . |
| 5122125 | of 1993 | Japan . |
| 5259950 | of 1993 | Japan . |
| 7-79484 | of 1995 | Japan . |
| 8-37684 | of 1996 | Japan . |
| 8-65222 | of 1996 | Japan . |
| 8116306 | of 1996 | Japan . |
| 9-23176 | of 1997 | Japan . |
| 9107579 | of 1997 | Japan . |
| 9191304 | of 1997 | Japan . |
| 91 07019 | 5/1991 | WIPO . |
| 91 09494 | 4/1995 | WIPO . |

OTHER PUBLICATIONS

Office Action Issued by the Japanese Patent Office Dated Oct. 13, 1998 and a Translation thereof.

*Primary Examiner*—Reinhard J. Eisenzopf
*Assistant Examiner*—Edan Orgad
*Attorney, Agent, or Firm*—Ostrolenk, Faber, Gerb & Soffen, LLP

[57] ABSTRACT

A cell-site base station apparatus comprises an array of diversity antennas for receiving multipath components of a mobile-transmitted signal. Receivers, connected to the antennas, produce strength indication signals and demodulated signals. For transmission of a control signal from the cell-site to a mobile station, a variable gain transmitter is coupled to one of the antennas and the control signal is sent at a first power level. When a connection is established for the mobile station, the strength indication signals from the receivers are examined to detect a highest strength value and one of the antennas is selected at which the multipath component of the highest strength value is arriving. The transmitter is then switched to the selected antenna for transmitting traffic signals and the gain of the transmitter is set to a second power level lower than the first power level to compensate for the transmit diversity gain of the selected antenna.

14 Claims, 2 Drawing Sheets

DIVERSITY GAIN CONTROLLED CELL-SITE TRANSMISSION TO PREVENT TRAFFIC SIGNALS FROM PROPAGATING BEYOND REACHABLE EXTENT OF CONTROL SIGNALS

BACKGROUND OF THE INVENTION

1. Field of the Invention

The present invention relates generally to cellular mobile communication systems, and more specifically to diversity reception of mobile-transmitted signals. The present invention is particularly useful for time division multiple access time division duplex (TDMA-TDD) mode of operation.

2. Description of the Related Art

In a conventional cell-site station of a TDMA-TDD mobile communication network, an array of antennas is used for diversity reception of multipath components of a mobile-transmitted, uplink traffic signal. Receivers are connected to the antennas for demodulation and detection of strength indication signals. The strength indication signals are examined and the best antenna is selected for receiving the highest multipath component. This antenna is also used during a subsequent transmit mode to obtain transmit diversity gain. Control signals, on the other hand, are transmitted using one of the antennas so that the range of the transmitted control signals delineates the boundary of the cell. Since no transmit diversity gain is obtained from the transmission of downlink control signals, their reachable extent is smaller than that of the downlink traffic signals. The traffic signals thus propagate beyond the boundary of the cell, and cause interference with adjacent cells.

SUMMARY OF THE INVENTION

It is therefore an object of the present invention to prevent interference between transmissions from neighboring cells.

According to a first aspect of the present invention, there is provided a cell-site base station apparatus comprising a plurality of diversity antennas for receiving multipath components of a mobile-transmitted signal, a plurality of receivers for respectively receiving signals from the antennas and producing strength indication signals respectively indicating strengths of the multipath components, and a variable gain transmitter. Coupling means are connected between the transmitter and the antennas. Gain control circuitry is provided for coupling the transmitter to one of the antennas to send a control signal to a mobile station at a first power level. When a connection is established for the mobile station, the gain of the transmitter is set to a second power level lower than the first power level and the strength indication signals are examined to determine a highest strength value, and the coupling means are operated so that one of the antennas is selected at which the multipath component of the highest strength value is arriving and the transmitter is coupled to the selected antenna.

According to a second aspect, the present invention provides a method for operating a cell-site base station having a plurality of diversity antennas for receiving multipath components of a mobile-transmitted signal, a plurality of receivers for respectively receiving signals from the antennas and producing strength indication signals and demodulated signals, and a variable gain transmitter, the method comprising the steps of transmitting a control signal to a mobile station at a first power level, detecting when a connection is established for the mobile station, examining the strength indication signals from the receivers to determine a highest strength value and selecting one of the antennas at which the multipath component of the highest strength value is arriving, and transmitting a traffic signal from the selected antenna to the mobile station at a second power level lower than the first power level.

BRIEF DESCRIPTION OF THE DRAWINGS

The present invention will be described in further detail with reference to the accompanying drawings, in which.

DETAILED DESCRIPTION

Figure 1:
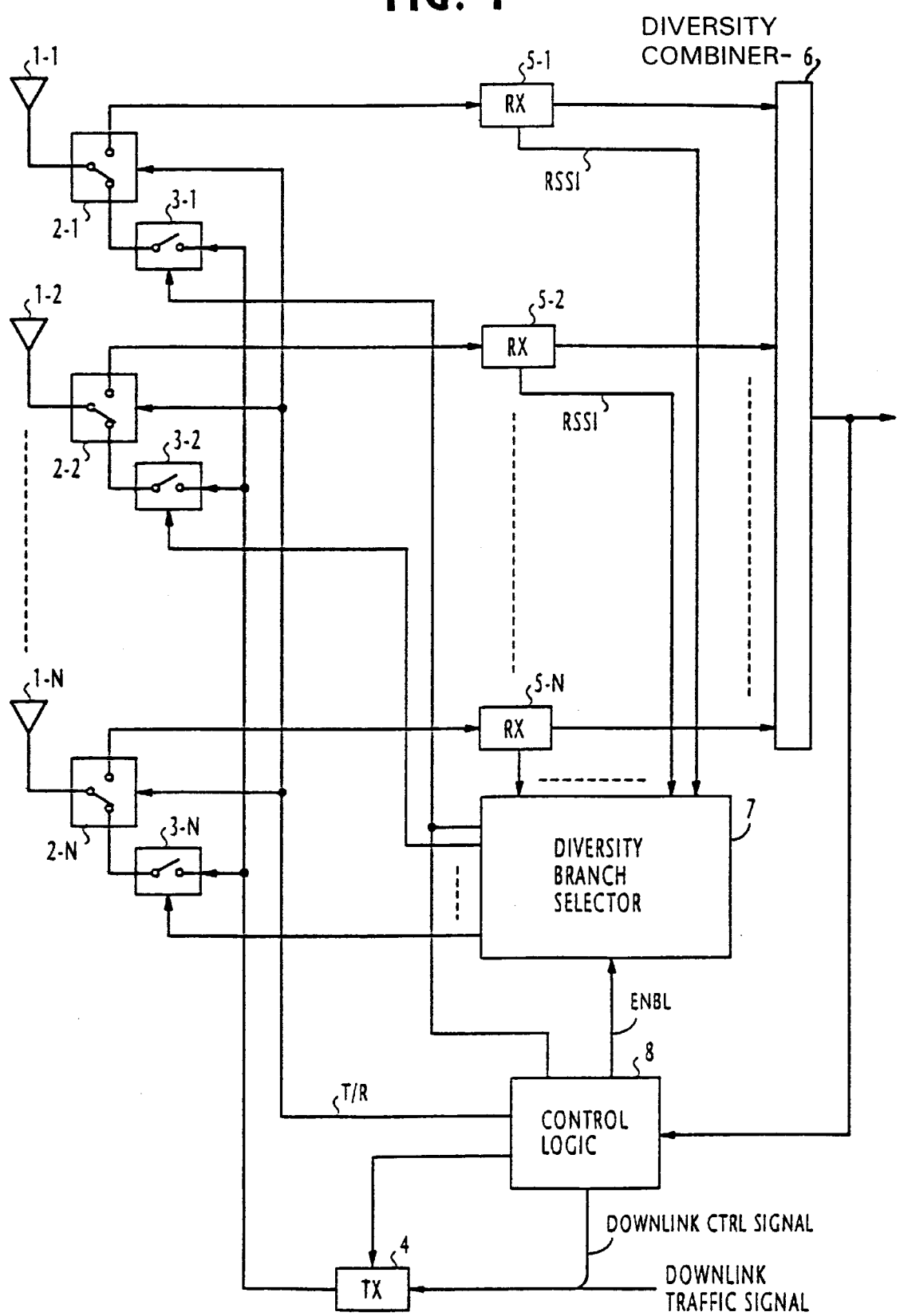
FIG. 1 is a block diagram of a cell-site base station according to the present invention.

In FIG. 1, there is shown a cell-site base station of a TDMA-TDD (time division multiple access-time division duplex) cellular communication network according to the present invention. The base station uses a plurality of antennas 1-1 through 1-N for receiving uplink (mobile-to-base) signals and transmitting downlink (base-to-mobile) signals. One of the antennas, for example, antenna 1-1, is used for exchanging control signals with mobile stations in a non-diversity mode. When traffic signals are exchanged, the base station switches to diversity mode in which all antennas are used for reception. To achieve diversity reception, the antennas are sufficiently spaced far apart so that multipath components of a mobile-transmitted signal have significantly different propagation delays at the antennas, i.e., the signals received by the antennas fade independently so that they are uncorrelated with each other.

Since the system operates on the time division duplex mode, all antennas alternately operate in transmit and receive modes. For this reason, the antennas are connected to respective transmit/receive switches 2-1 through 2-N for duplex operation. When a particular frequency is assigned to a mobile user, the same frequency is used for both transmission and reception. The transmit terminal of switches 2-1 through 2-N is connected via a corresponding one of diversity switches 3-1 through 3-N to the output of a gain-controlled transmitter 4 where a baseband control/traffic signal is modulated onto a downlink carrier frequency for transmission from antenna 1-1. The receive terminal of switches 2-1 through 2-N is connected to a corresponding one of receivers 5-1 through 5-N, where the diversity branch signals (multipath component signals) from the antennas are demodulated into baseband signals and supplied to a diversity combiner 6 where the multipath component signals are diversity-combined. As is well known in the art, the diversity combiner 6 may be operated on a selective mode in which the strongest signal is selected for delivery or on a combining mode in which the multipath components are phase-aligned and combined together.

Each of the receivers 5-1 through 5-N further produces an RSSI (receive signal strength indication) signal indicating the strength of the signal received by the corresponding antenna. The RSSI signals from receivers 5-1 through 5-N are applied to a diversity branch selector 7.

A control logic 8 is connected to the output of the diversity combiner 6 to receive uplink control signals from mobile stations. Control logic 8 provides an overall control of the base station including the broadcasting of frame structure and system information using a unidirectional BCCH (broadcasting control channel) time slot or channel, and the establishing of a connection using a bi-directional SCCH (signaling control channel) channel. For this purpose, control logic 8 is connected to the diversity switch 3-1 to close its path between the antenna 1-1 and the transmitter 4 and supplies downlink control signals to the transmitter 4. Control logic 8 is also connected to switches 2-1 to 2-N to alternate their paths between transmit and receive circuits at high speed for the time division duplex operation.

In response to a call request from a mobile station, control logic 8 executes call setup procedure on the SCCH channel and detects the instant when a connection is established on a traffic channel (TCH). When this occurs, control logic 8 enables the diversity branch selector 7 to cause it detect the RSSI signal of highest value. Diversity branch selector 7 operates one of the diversity switches 3 to connect the transmitter 4 to the antenna at which the highest strength signal is being received. Since the system operates in a time division multiplex mode, the diversity branch selector 7 determines the highest RSSI signal for each traffic channel of TDMA frames so that the operating pattern of diversity switches 3-1 to 3-N is reconfigured on a time-slot basis to support other connections during successive time slots.

When a call request is received from a new mobile station, the control logic raises the gain of transmitter 4 for a brief interval to send a downlink control signal on the SCCH channel to initiate a call setup procedures.

When one of the antennas is selected as the best path for receiving the multipath component of highest strength, the transmitter 4 is connected to the selected antenna for transmission of downlink traffic signals on TCH time slots. As is well known in the art, there is an increase in base-station transmission power corresponding to the receive diversity gain. This is particularly acute when reception and transmission are switched alternately at short intervals on a Rayleigh fading channel. This effect is known as transmit diversity gain.

While diversity reception is desirable, the transmit diversity gain is undesirable from the interference viewpoint since downlink signal propagates beyond the reachable extent of downlink control signal that delineates the cell boundary of the base station. To prevent this interference problem, when a connection is established, control logic 8 sets the gain of transmitter 4 to a level lower than the gain used for sending the control signal so that the downlink traffic signal sent to the requesting mobile user does not propagate beyond the boundary of the cell.

Figure 2:
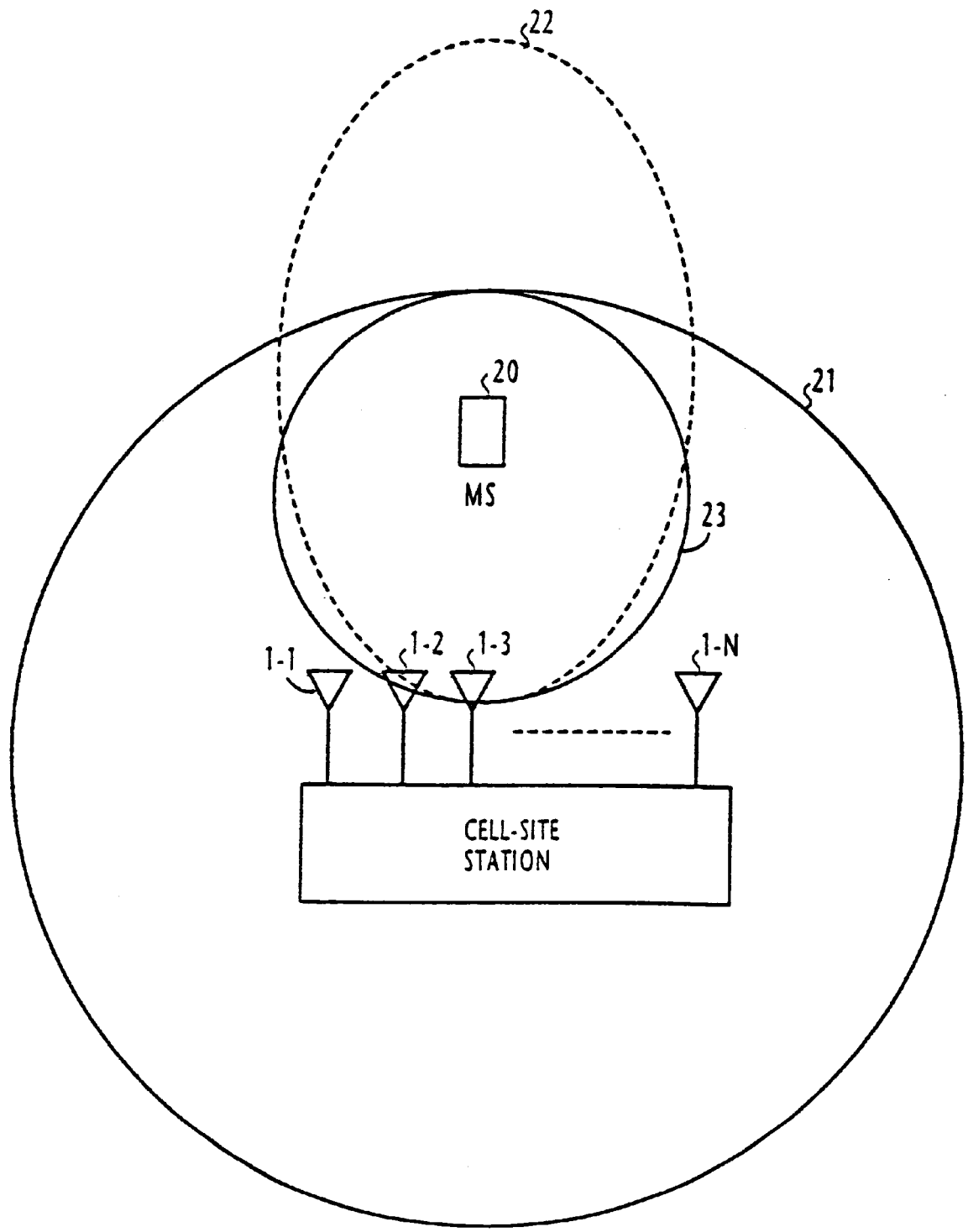
FIG. 2 is a schematic view illustrating cell boundary and transmission ranges of downlink signals from the base station.

As illustrated in FIG. 2, when control signal is transmitted from the base station using antenna 1-1 to a mobile station 20, the reachable extent of the transmitted control signal defines the boundary of the cell as indicated by numeral 21. When a connection is established-and antenna 1-3, for example, is selected as the best receiving path, the power level of transmitter 4 is lowered by an amount equal to an apparent increase in the transmit diversity gain. If the transmission power were not reduced, the reachable extent of a transmitted traffic signal would reach beyond the boundary 21 as indicated by dotted line 22. By the power reduction, the traffic signal from antenna 1-3 has the same reachable extent as indicated by a circle 23.

What is claimed is:

1. A cell-site base station apparatus comprising:

a plurality of diversity antennas for receiving multipath components of a mobile-transmitted signal;

a plurality of receivers for respectively receiving signals from said antennas and producing strength indication signals respectively indicating strengths of said multipath components;

a variable gain transmitter;

coupling means connected between the transmitter and said antennas; and gain control circuitry for coupling said transmitter to one of said antennas to send a control signal to a mobile station at a first power level, setting the gain of said transmitter to a second power level-lower than said first power level and examining said strength indication signals to determine a highest strength value when a connection is established for said mobile station, and operating said coupling means so that one of said antennas is selected at which the multipath component of the highest strength value is arriving and said transmitter is coupled to the selected antenna.

2. A cell-site base station as claimed in claim 1, wherein said second power level differs from the first power level by an amount substantially equal to a diversity gain of said selected antenna.

3. A cell-site base station apparatus as claimed in claim 1, wherein the gain control circuitry operates on a time-slot basis.

4. A cell-site base station apparatus as claimed in claim 1, further comprising a diversity combiner for diversity combining signals demodulated by said receivers.

5. A cell-site base station apparatus comprising:

a plurality of diversity antennas for receiving multipath components of a mobile-transmitted signal;

a plurality of receivers for respectively receiving signals from said antennas and producing strength indication signals respectively indicating strengths of said multipath components;

a variable gain transmitter;

means including a plurality of duplexing switches for alternately connecting said antennas to said receivers and said transmitter;

a plurality of diversity switches connected between the transmitter and said duplexing switches; and gain control circuitry for coupling said transmitter to one of said antennas to send a control signal to a mobile station at a first power level, setting the gain of said transmitter at a second power level lower than the first power level and examining said strength indication signals from said receivers to determine a highest strength value when a connection is established for said mobile station, and operating one of said diversity switches so that one of said antennas is selected at which the multipath component of the highest strength value is arriving and said transmitter is coupled to the selected antenna.

6. A cell-site base station as claimed in claim 5, wherein said second power level differs from the first power level by an amount substantially equal to a diversity gain of said selected antenna.

7. A cell-site base station apparatus as claimed in claim 6 wherein the gain control circuitry operates on a time-slot basis.

8. A cell-site base station apparatus as claimed in claim 5, further comprising a diversity combiner for diversity combining signals demodulated by said receivers.

9. A method for operating a cell-site base station having a plurality of diversity antennas for receiving multipath components of a mobile-transmitted signal, a plurality of receivers for respectively receiving signals from said antennas and producing strength indication signals respectively indicating strengths of said multipath components, and a variable gain transmitter, the method comprising the steps of a) transmitting a control signal to a mobile station at a first power level;
b) detecting when a connection is established for said mobile station;
c) examining said strength indication signals from said receivers to determine a highest strength value and selecting one of said antennas at which the multipath component of the highest strength value is arriving; and
d) transmitting a traffic signal from the selected antenna to the mobile station at a second power level lower than the first power level.

10. The method of claim 9, wherein said second power transmission level differs from the first power transmission level by an amount substantially equal to a diversity gain of said selected antenna.

11. The method of claim 9, further comprising the steps of operating said antennas in an alternating transmit and receive mode for time division duplex operation and repeating the steps (a) to (d) on a time-slot basis.

12. A method for operating a cell-site base station, the base station comprising a plurality of diversity antennas for receiving multipath components of a mobile-transmitted signal, a plurality of receivers for respectively receiving signals from said antennas and producing strength indication signals respectively indicating strengths of said multipath components, and means including a plurality of duplexing switches for alternately connecting said antennas to said receivers and said transmitter, the method comprising:
a) alternately operating said antennas in transmit and receive modes of time division duplex operation;
b) transmitting a control signal to a mobile station at a first power level;
c) detecting when a connection is established for said mobile station;
d) examining the strength indication signals from said receivers to determine a highest strength value and selecting one of said antennas at which the multipath component of the highest strength value is arriving; and
e) transmitting a traffic signal from the selected antenna to the mobile station at a second power lower than the first power level.

13. The method of claim 12, wherein said second power transmission level differs from the first power transmission level by an amount substantially equal to a diversity gain of said selected antenna.

14. The method of claim 12, further comprising the step of repeating the steps (b) to (e) on a time-slot basis.

* * * * *